United States Patent [19]

Poloni

[11] Patent Number: 4,679,801
[45] Date of Patent: Jul. 14, 1987

[54] LABYRINTH SEAL WITH PRESSURIZED SEALING PACKING

[75] Inventor: Alfredo Poloni, Ronchi Del Legionari, Italy

[73] Assignee: Danieli & C. Officine Meccanische SpA, Buttrio, Italy

[21] Appl. No.: 834,598

[22] Filed: Feb. 28, 1986

[30] Foreign Application Priority Data

Feb. 28, 1985 [IT] Italy ................. 83334 A/85

[51] Int. Cl.⁴ .................. F16J 15/32; F16J 15/447
[52] U.S. Cl. ........................... 277/53; 277/84; 277/153
[58] Field of Search ................. 277/53–57, 277/152, 153, 134, 84

[56] References Cited

U.S. PATENT DOCUMENTS

| 1,722,135 | 7/1929 | Frey | 277/54 |
|---|---|---|---|
| 2,583,671 | 1/1952 | Schmitter | 277/57 |
| 2,620,207 | 12/1952 | Wilfrey | 277/57 X |
| 2,740,647 | 4/1956 | Van Pelt | 277/56 X |
| 2,819,100 | 1/1958 | Peterson | 277/56 X |
| 3,144,280 | 8/1964 | Sorenson | 277/57 X |
| 3,912,284 | 10/1975 | Gosling et al. | 277/53 X |
| 4,183,417 | 1/1980 | Levefelt . | |
| 4,379,600 | 4/1983 | Muller | 277/56 X |
| 4,384,387 | 5/1983 | Pachuta | 277/53 X |
| 4,427,202 | 1/1984 | Backlin | 277/153 X |
| 4,428,630 | 1/1984 | Folger et al. | 277/153 X |

FOREIGN PATENT DOCUMENTS

| 854448 | 11/1952 | Fed. Rep. of Germany | 277/84 |
|---|---|---|---|
| 953029 | 11/1956 | Fed. Rep. of Germany | 277/152 |
| 2414634 | 10/1974 | Fed. Rep. of Germany | 277/84 |
| DE3230701 | 8/1982 | Fed. Rep. of Germany . | |
| 2512914 | 9/1982 | France . | |
| 1211501 | 3/1983 | France . | |

Primary Examiner—Robert S. Ward
Attorney, Agent, or Firm—Wegner & Bretschneider

[57] ABSTRACT

Labyrinth seal (11) which is suitable for providing a seal between elements in relative rotation in the presence of infiltrating substances and which is particularly, but not only, suitable for providing a seal between rolls (12) and a housing (16) of rolling stands (10), such seal (11) comprising a stationary collar (19) and a rotary collar (18) that together form a labyrinth (26), means (24) to deliver fluid under pressure and a sealing packing (20) of a flexible material, such sealing packing (20) being located in the innermost portion of the labyrinth (26) and facing such labyrinth (26), the means (24) to deliver fluid under pressure delivering such fluid under pressure to a portion of the labyrinth next to such sealing packing (20).

4 Claims, 2 Drawing Figures

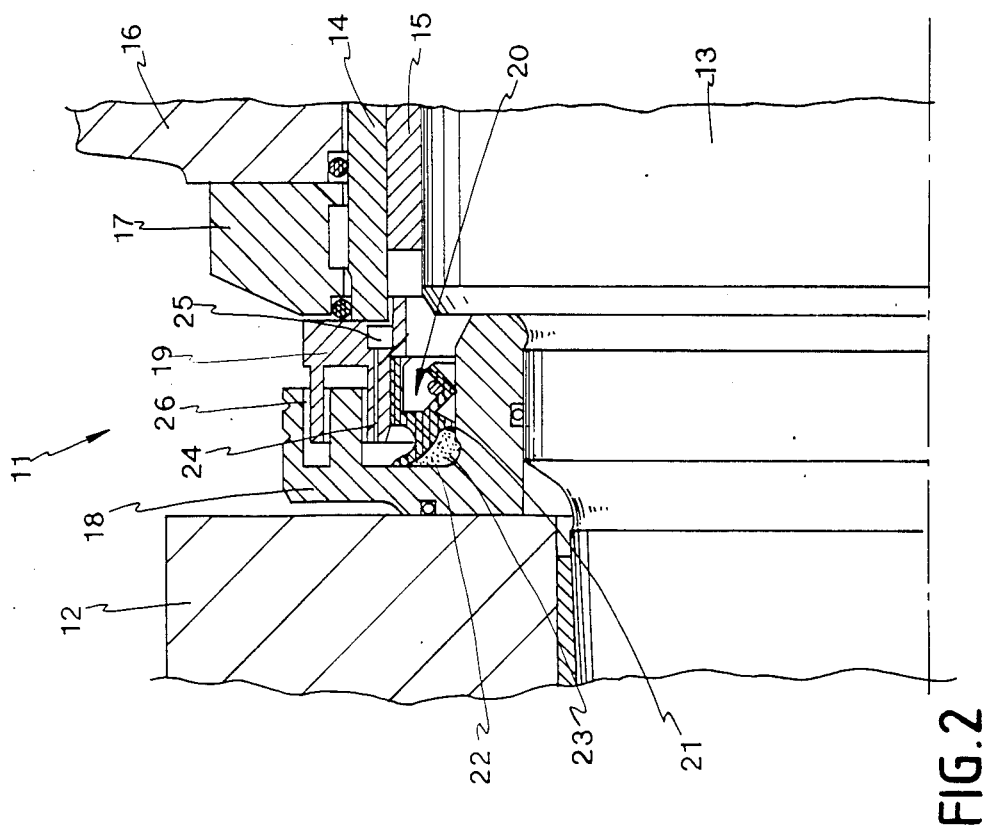
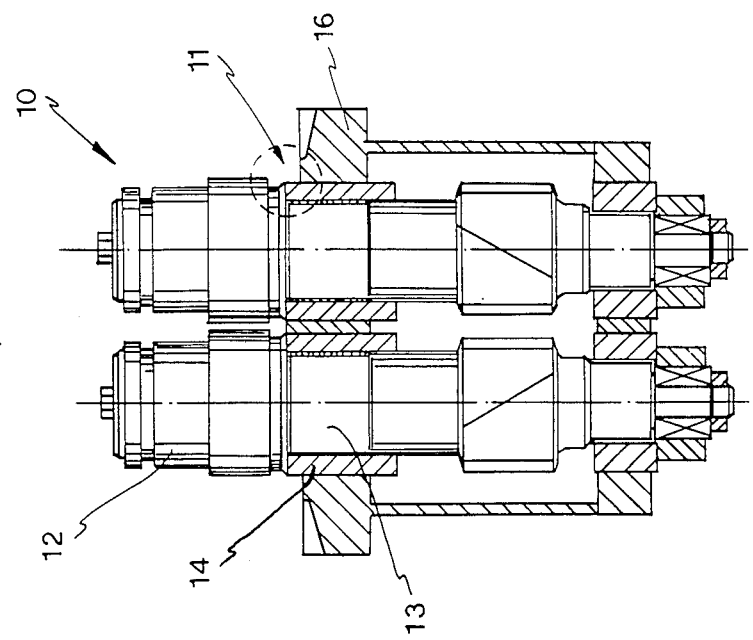

LABYRINTH SEAL WITH PRESSURIZED SEALING PACKING

This invention concerns a labyrinth seal of an improved type which is particularly suitable for use under severe conditions and in a polluted environment, as is the case with rolling stands, for instance.

In particular, the labyrinth seal of the invention provides a secure barrier against the penetration of water, dust, metallic scale or other foreign bodies and thus preserves the rotary elements.

The invention is intended preferably, but not only, for application to rolling rolls or other rotary elements under environmental conditions which are critical owing to the presence of water, dirt or other substances.

Common labyrinth seals are known; in them a stationary collar and another collar solidly fixed to a rotary element form together a labyrinth. Such labyrinth has the purpose of making difficult the inward penetration of undesired substances such as dust, liquids, etc. and also, in certain embodiments, of preventing the escape of fluids outwards, owing to the heavy losses of load which occur in the labyrinth itself.

Patents are also known which disclose embodiments having variously conformed sealing packings, possibly entailing the injection of fluids as well.

For instance, FR-A-No. 2.512.914 is known and discloses a seal device for a rotary shaft as applied specifically to a rolling mill. This device comprises a pair of lip packings positioned back to back within a chamber in such a way as to form a space between them. Air under pressure, mixed with a lubricant, is blown into such space, and in this way lubrication is provided where the lips of the packings slide against the rotary shaft. In a preferred embodiment of this invention a labyrinth is included in the device on the side where the cooling water arrives.

DE-A-No. 3.230.701 discloses a roll head for a rolling mill with planetary gears. The head is equipped with a sliding seal, in correspondence with which it is possible to inject air under pressure through a system of ducts. Such injection of air under pressure prevents the entry of dirt into the cap of the rolls and also obviates the outward loss of oil.

Patent FR-A-No. 1.211.501 discloses a seal for rotary elements, such as the rolls of rolling stands, such seal employing a flexible packing equipped with a series of sealing lips. The sealing packing, which may consist of rubber for instance, comprises two lips sliding against the rotary element, two sealing lips with a stationary lodgement and a fin able to provide a further obstacle for the passage of oil, which is compelled to follow a longer path. Such fin extends towards the collection chamber of the lubrication oil.

Patent U.S. Pat. No. 4,183,417 discloses a rotary bit for drilling rock formations; to prevent infiltration of fragments of rock or dust, the bit is provided with an injection of air through channels located at the base of the rotary cutter ring.

SUMMARY OF INVENTION

A purpose of the invention is to provide a labyrinth seal which can not only perform a passive task of preventing the entry of foreign matter into contact with the rotary element but can carry out, above all, the active discharge of all material, whether liquid, solid or in suspension, which may penetrate within the labyrinth itself.

Another purpose of the invention is to provide a seal comprising a permanent insert of lubricant to seal the rotary element.

The purposes of the invention are attained through an injection of air provided in the innermost part of the labyrinth formed by a stationary collar and a rotary collar, both collars being shaped suitably; that is to say, the invention arranges an injection of air or another fluid under pressure into the labyrinth through one or more injection ducts, which lead from a suitable delivery manifold and open out preferably into the innermost part of the labyrinth. The injection of air or fluid under pressure into the labyrinth causes an outward flow of fluid from the labyrinth, and such flow prevents the penetration of foreign matter such as water, dirt, etc.

The purposes of the invention are also accomplished owing to the fact that a sealing packing is provided which cooperates by sliding against the movable collar, which in its turn is solidly fixed to the rotary elemnet. This sealing packing faces the labyrinth directly.

This sealing packing comprises an inner circumferential lip and a frontal lip, which cooperate by sliding against the rotary collar and define a toric space about the rotary collar. This toric space is filled with a permanent lubricant when the labyrinth seal is assembled.

A double seal is thus embodied in which the penetration of dirt, scale, dust, water or other foreign matter is prevented through the double action of the jet of air and of the seal formed by such packing together with the relative permanent lubricant. The injection of fluid under pressure takes place advantageously in the portion of the labyrinth immediately downstream of the packing.

The surfaces against which such lips slide may comprise a coating of hard metal, such as chromium oxide, to ensure a long working life and a better seal in cooperation with the lubricant.

This invention is therefore embodied in a labyrinth seal which is suitable for providing a seal between elements in relative rotation in the presence of infiltrating substances and which is particularly, but not only, suitable for providing a seal between rolls and a housing of rolling stands, such seal comprising a stationary collar and a rotary collar that together form a labyrinth, means to deliver fluid under pressure and a sealing packing of a flexible material, the seal being characterised in that such sealing packing is located in the innermost portion of the labyrinth and faces such labyrinth and that the means to deliver fluid under pressure deliver such fluid under pressure to a portion of the labyrinth next to such sealing packing.

BRIEF DESCRIPTION OF THE DRAWINGS

We shall now describe a preferred embodiment of the invention as a non-restrictive example with the help of the attached figures, in which:

FIG. 1 shows an example of the application of the invention;

FIG. 2 gives a detailed view of a preferred embodiment of the invention.

DETAILED DESCRIPTION

In the figures, the invention is applied to a rolling stand 10 having rolls supported at only one end, but this application should not be deemed restrictive and has been chosen for this example precisely because working conditions in the sealing zone 11, shown here with a circle of dashes, are absolutely among the most severe conditions to be found.

In fact, in this case the sealing zone 11 is bathed with cooling water and is polluted by scale detached from rolled stock by dirt and dust of every type, which combine to form sludges readily capable of penetrating and coming into contact with the rotary elements.

It is therefore very easy for the rotary elements, consisting of shafts 13, in known embodiments to come in contact with foreign matter from the exterior, with a consequent risk of damage of such shafts and of their relative supports.

The FIG. 1 shows rolling rolls 12 supported by rotary shafts 13, which the invention proposes to preserve from damage.

Such shafts 13 are supported by a housing 16 by means of bushes 14 comprising metallic bearings 15 or other suitable bearings (see FIG. 2).

In FIG. 2 a ring 17 is solidly fixed to the housing 16; in the arrangement of FIG. 1 a stationary collar 19 is positioned above the ring 17.

The stationary collar 19 is suitably shaped so as to form a labyrinth 26 in conjunction with a collar 18 able to move and solidly fixed to the rolling roll 12.

The labyrinth 26 comprises ducts 24 to deliver air which start from a delivery manifold 25.

The ducts 24, of course, have a disposition, number and section suited to the flow of air required on each occasion for the situation in question.

The injection of air created by such ducts 24 produces in the labyrinth 26 a flow of air which prevents the penetration of water, dust and foreign matter into the labyrinth itself.

Moreover, a sealing packing 20 is located in the inner portion of the labyrinth 26 and cooperates between the stationary collar 19 and movable collar 18.

According to the invention such packing cooperates with the rotary collar 18 by means of two sliding lips 21 and 22.

The lip 21 cooperates by circumferential sliding substantially on the inside of the packing 20, whereas the lip 22 cooperates by sliding frontally against an annular surface of the collar 18.

The lips 21-22 together with the collar 18 define a substantially toroidal space having an approximately trapezoidal section in the example shown. Such a toroidal space is filled with permanent lubricant 23. The lip 22 separates this toroidal space from the labyrinth 26.

The provision of the two lips 22-21 defining a toroidal space filled and sealed with lubricant 23 provides a further barrier against the penetration of dirt and foreign substances within the seal 11 shown.

We have described here a preferred embodiment of this invention but variants are possible without departing thereby from the scope of the idea of the solution.

Thus, for instance, it would be possible to provide air delivery ducts 24 in one or the other or both collars 18-19 and to provide a labyrinth 26 variously tortuous by changing the number of mutually penetrating peripheral flanges with which the collars 18-19 are equipped.

Likewise, it would be possible to provide a greater number or diverse conformation of the sealing lips 21-22 of the sealing packing 20.

These and other variants are all possible without departing thereby from the scope of this invention.

I claim:

1. A labyrinth seal for providing a seal between elements in relative motion, comprising:
   a stationary collar
   rotary collar
   a labyrinth defined by said stationary collar and said rotary collar;
   a sealing packing of a flexible material located in the innermost portion of said labyrinth and facing said labyrinth, said sealing packing comprising at least one inner lip and at least one frontal lip, each of said lips contacting said rotary collar, said packing and said rotary collar defining a toric space, the rotary collar being rotatable with respect to the inner lip and the frontal lip; and
   means to deliver fluid under pressure to a portion of the labyrinth next to said sealing packing.

2. A labyrinth seal as claimed in claim 1, wherein said frontal lip separates the toric space from the labyrinth.

3. A labyrinth seal as claimed in claim 1 wherein the toric space is filled with permanent lubricant.

4. A labyrinth seal as claimed in claim 2, wherein the toric space is filled with permanent lubricant.

* * * * *